United States Patent [19]
Sullivan, Jr. et al.

[11] 3,784,303
[45] Jan. 8, 1974

[54] AUTOMATIC MICROFICHE COPIER

[75] Inventors: William A. Sullivan, Jr., Webster; Augustus W. Griswold, Rush, both of N.Y.

[73] Assignee: Xerox Corporation, Stamford, Conn.

[22] Filed: May 1, 1972

[21] Appl. No.: 249,232

[52] U.S. Cl. .................... 355/50, 355/53, 355/54, 355/64
[51] Int. Cl. ............................. G03b 27/46
[58] Field of Search ............... 355/53, 3, 7, 11, 355/14, 50, 54, 64

[56] References Cited
UNITED STATES PATENTS
3,591,282  7/1971  Renold ................................. 355/54
3,620,623  11/1971  Reams, Jr. et al. ................... 355/53

Primary Examiner—Samuel S. Matthews
Assistant Examiner—Richard A. Wintercorn
Attorney—James J. Ralabate et al.

[57] ABSTRACT

A microfiche copier automatically scans successive rows of microfiche frames and copies the scanned frames onto a fanfolded copy web, to produce a copy set which when bound on one edge provides a quasi duplex book form of copy of the successive frames. The scanning of successive microfiche frames is synchronized with the copy web to locate each frame on a separate panel of the fanfolded web.

13 Claims, 14 Drawing Figures

AUTOMATIC MICROFICHE COPIER

BACKGROUND AND SUMMARY OF INVENTION

The present invention relates to the reproduction of documents from microfiche cards, and more particularly to the automatic reproduction of a sequence of frames from a microfiche card and the production of copies on a continuous fanfold web in quasi bound volume duplex form.

A microfiche card is a convenient form for the microfilm storage of multipage documents, wherein each page of the document is reproduced on a separate frame of the card. Prior art equipment is known wherein the microfiche card is positioned on the transport carriage of a reader, and the carriage is then adjusted to selected x and y coordinates to place a selected frame of the card in position to be enlarged and projected on a viewing screen. Such a selected frame may then be copied by various photocopying techniques to produce a readable macro copy of the selected frame. One common and convenient manner of reproducing the frame is that known as electrostatic photocopying, or xerography. This manual process of selecting a desired microfiche card frame and then copying it, is convenient and suitable if only one or two frames of the card are sought. However, if the document sought from the microfiche card is a multipage document presented on a large number of successive frames of the microfiche card, the need to proceed manually from frame to frame in a step and repeat process can be time consuming and expensive, particularly if one desires to obtain multiple copies of the document. Not only is one burdended with the process of successive manual locations of the microfiche card, but the resultant single sheet copies must then be collated and assembled.

In accordance with the present invention, however, a microfiche card carriage or transport is provided whereby successive frames of the card, including the frames of successive rows and of the entire card if desired, are automatically scanned in a continuous scan mode (as distinguished from a step and repeat mode) and projected onto photocopying equipment for the production of macro copy of the document. The photocopying aspect of the invention includes the continuous feed of copy paper in synchronism with the optical scan of the microfiche card, utilizing a fanfold form of copy paper that delivers the copy in collated quasi book form. Multiple copies may be obtained by repeating the complete scan sequence a desired number of times.

The microfiche carriage or transport mechanism of the present invention includes a microfiche card mount that is carried on mutually perpendicular ways for movement along x and y coordinates, with appropriate mechanical stops and electrical controls to reference the card mount to the optics and reproduction elements of the copying system. With the microfiche card positioned in the mount, the scan starts with the first frame of the first row, progresses continuously across the first row of the card, then in a flyback operation returns to the first column and begins to scan the second row of microfiche frames, etc. Scan is effected by transporting the card mount, while the copying optics is retained stationary.

Preferably, the copy reproduction system is a well known electrostatic copier of conventional design, including a photoreceptor drum that rotates with a surface speed that is synchronized with the speed of scan of the microfiche card. As is well understood in the art, an optical scan image of the microfiche frames is projected onto the drum to form electrostatic latent images of the successive frames on the photoreceptor drum, and the latent images are developed with electroscopic powder and transferred to a receiving web where the images are permanently formed as readable macro copy. of importance to the present invention is the form of the fanfolded receiving or copy web. Viewed as a folded stack, each flat sheet is joined to the next by a crease or fold line along adjacent side edges, with folds alternating in direction. In addition, each sheet is provided with a series of punches along one side edge, with the punches for all the sheets being along the same side edge of the fanfolded stack. The punches enable a series of sheets upon which the microfiche images have been formed to be assembled with a binder into quasi book form. In addition, the punches provide a reference for the location of the fanfolded web sheets in their feed through the photocopying apparatus, and the sensing of these punches at a reference point in the feed path is used to synchronize the microfiche scan with copy web feed, so that each microfiche frame is printed or copied onto a separate sheet of the copy web.

It is therefore one object of the present invention to provide for the automatic photocopying of a succession of microfiche frames.

Another object of the present invention is to provide for the continuous scan of successive frames and successive rows of frames of the microfiche card, and the projection thereof into the reproduction system of a copier.

Another object of the present invention is to provide for the synchronization of the scan of successive microfiche frames with the operation of a copying system for reproducing said frames in macro copy.

Another object of the present invention is to provide for said reproduction of a fanfolded web, wherein each microfiche frame is reproduced on a separate sheet of said web.

And still a further object of the present invention is to provide for said reproduction of said fanfolded web, wherein the copies of successive microfiche frames are produced in collated and quasi book form.

Other objects and advantages of the present invention will become apparent to those skilled in the art from a consideration of the following detailed description of one exemplary and illustrative embodiment of the invention, had in conjunction with the accompanying drawings in which like reference characters refer to like or corresponding parts, and wherein:

DETAILED DESCRIPTION

Figure 1:
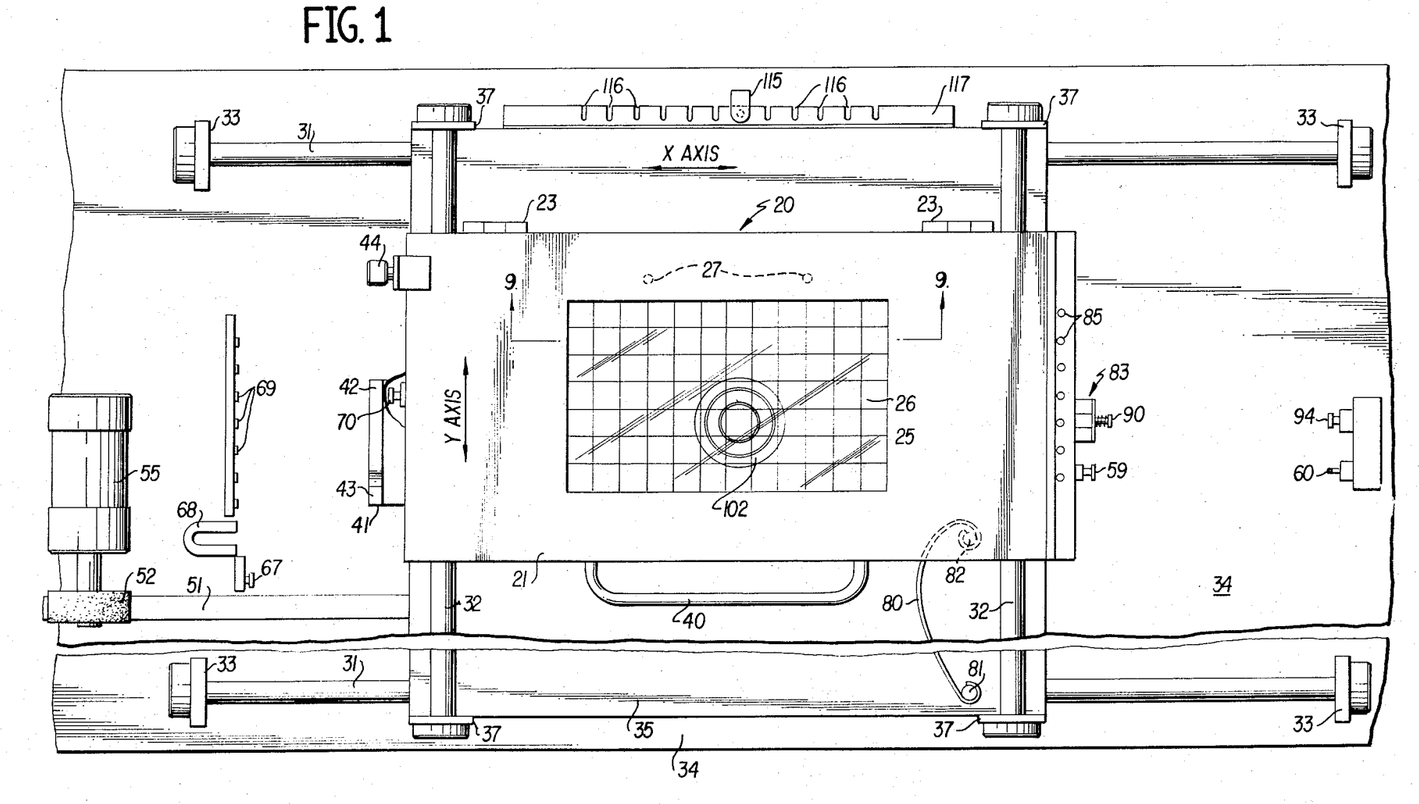
FIG. 1 is a top plan view of an embodiment of the invention.
Figure 2:
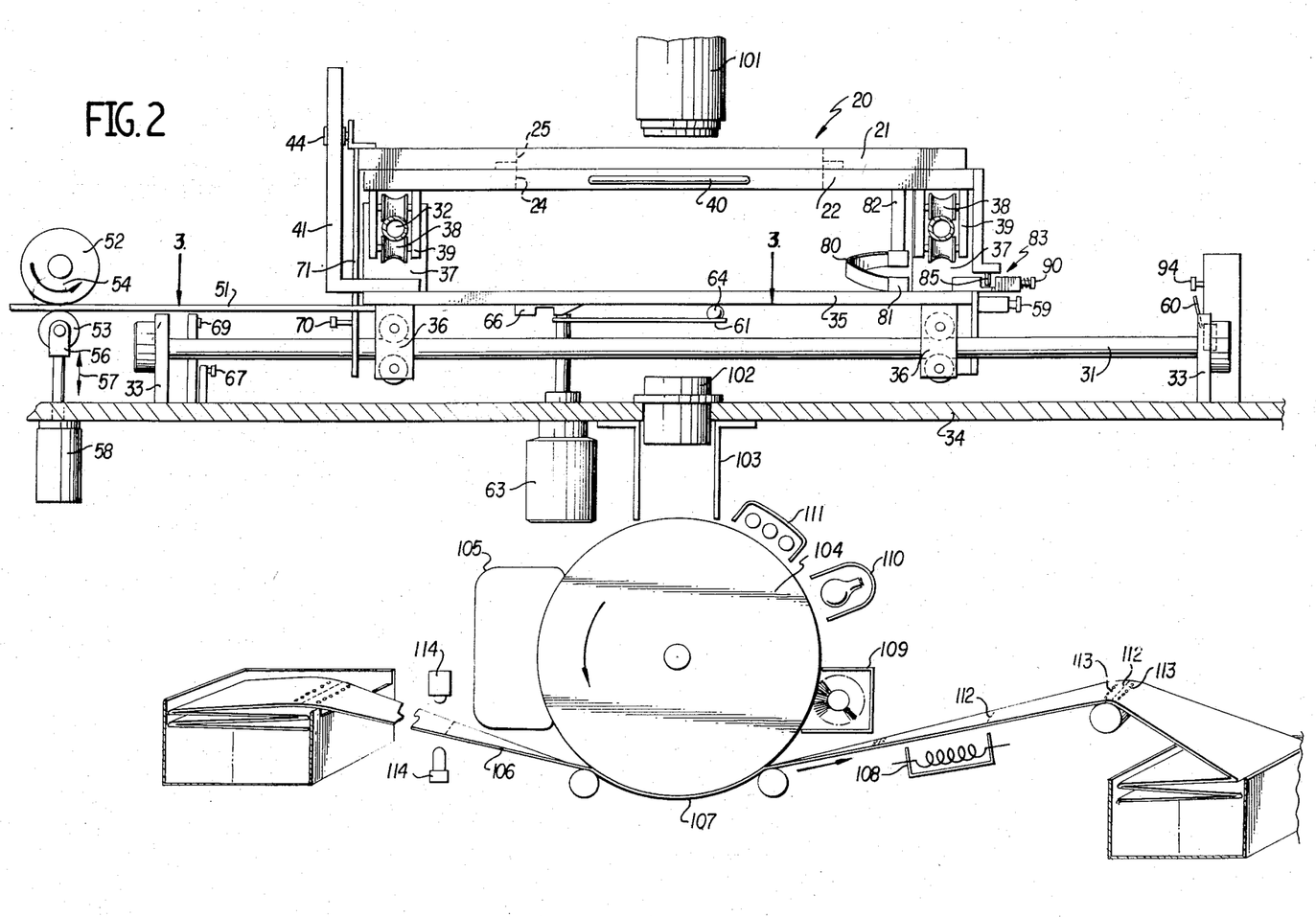
FIG. 2 is an elevation view, partially in section, of the embodiment of FIG. 1.
Figure 9:
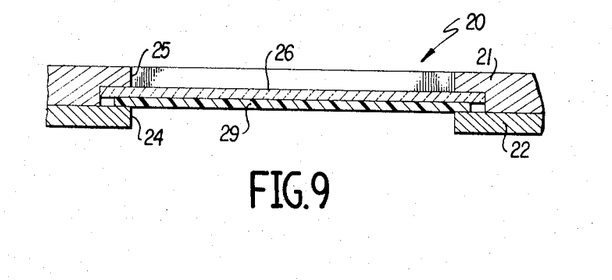
FIG. 9 is an enlarged fragmentary sectional view of the microfiche holder, taken along line 9—9 of FIG. 1.

Referring to the drawings, a microfiche card mount is generally identified by the numeral 20, and comprises two plates 21 and 22 hinged along their back edges at 23. Both plates are essentially frame-like in structure defining overlying central rectangular open areas corresponding in shape and size to the record area of a standard microfiche card. The open area 24 in bottom plate 22 may be open or covered with a transparent film or glass plate if desired. The open area 25 in the upper plate is preferably covered with a transparent film or glass plate 26 having opaque grid markings thereon corresponding to the standard microfiche frame layout, the grid markings delineating the spacing between microfiche frames. A pair of registration pins 27 project upwardly from the back section of the lower frame plate 22, corresponding to registration apertures provided in the microfiche card. A microfiche card is inserted in the mount by raising upper plate 21 about the back hinges 23, placing a microfiche card on the bottom plate 22 with its registration holes engaged by registration pins 27, and lowering the top plate 21 thereover. Each frame of the microfiche card should be delineated by the opaque grid on glass plate 26. By controlled transport on the mount 20, successive frames may be copied.

The mount 20 is moveable along x and y axes on pair of rails 31 and 32 respectively. The pair of rails 31 extend along the x axis and are mounted on brackets 33 supported by the base 34. Carriage 35 is mounted for linear traverse along rails 31 by sets of paired roller 36, and this carriage carries the pair of rails 32 mounted thereon by brackets 37. The microfiche mount 20 is in turn mounted for linear traverse on the y axis rails 32 by sets of paired rollers 38 affixed to the underside of bottom plate 22 by brackets 39. Thus, by grasping the handle 40 attached to the forward edge of the bottom plate 22 of mount 20, an operator may manually move the mount 20 along the x and y axes on rails 31 and 32, respectively.

Figure 8A:
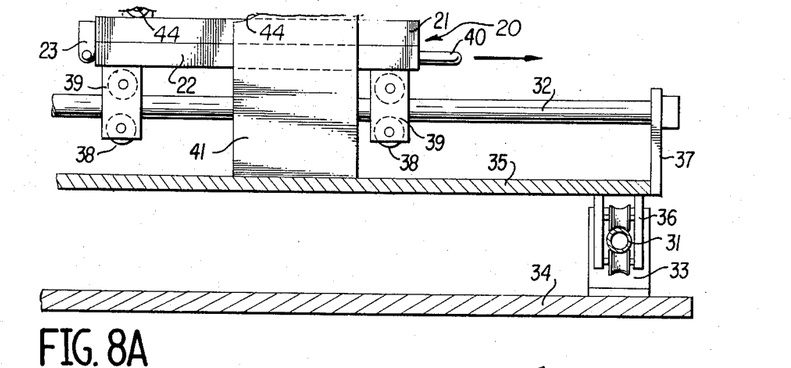
FIG. 8A–C are stepwise operational views of a cam opener for the microfiche holder.
Figure 8B:
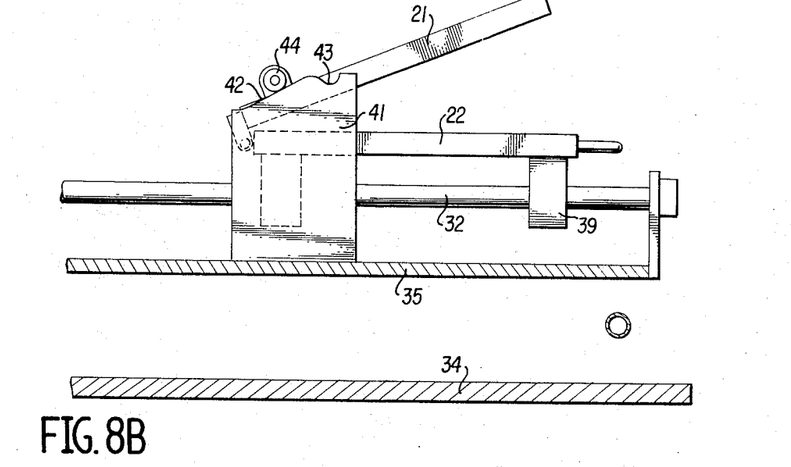
Figure 8C:
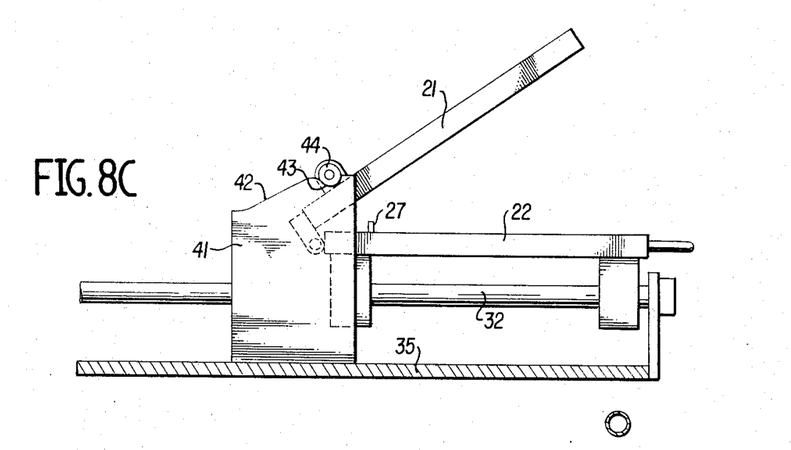

Carriage 35 carries an upstanding plate 41 whose upper portion is shaped to provide a sloping cam surface 42 terminating in a depression or notch 43. A cam follower roll 44 is mounted on upper plate 21 of mount 20, and projects therefrom to align with the cam surface 42. The cam surface 42 and follower roll 44 are relatively located so that when the mount 20 is pulled forward to the maximum limit of travel along rails 32, the roll 44 engages the cam 41 near the end of the mount's traverse, is caused to ride up its sloping surface 42, and finally enters notch 43 at the very limit of forward travel of mount 20 along rails 32. When follower roll 44 rides up cam surface 42, it pivots upper plate 21 about the hinges 23, and when the roll enters notch 43 the mount 20 is retained in its most forward position with its plates 21 and 22 separated or open for removal of a microfiche card and the positioning of another card on the mount. With a new card positioned on the mount, the operator may push the mount rearwardly by means of the handle 40, overriding the retention force of notch 43, causing the roll 44 to descend along the cam surface 42, and resulting in closure of mount 20, whereupon the mount may be positioned as desired along the rails 32 and 32.

One purpose of the present invention is to provide for the automatic scan of a microfiche card 29 positioned in the mount 20, and this result is effected by automatic transport of the mount 20 along the x and y axes of the microfiche card on rails 31 and 32. First, it is desired to describe the x axis transport. A rigid drive strap 51 is affixed to carriage 35 and extends therefrom to enter the nip between rollers 52 and 53. Roller 52 is the drive roller of the pair and is driven in the rotational direction of arrow 54 by motor 55. Idler roll 53 is carried by a yoke 56 mounted for reciprocatory movement in the directions of arrow 57 under the drive force of solenoid 58. When solenoid 58 is energized, roller 53 is forced upwardly to pinch strap 51 between it and drive roller 52, thereby causing roller 52 to drive the strap 51 and consequently the carriage 35 and microfiche mount 20 to the right, as viewed in FIGS. 1 and 2. This direction of travel is part of the scan mode of operation. When the carriage has been driven to the position which defines the limit of scan of the microfiche card 29, finge 59 engages switch 60, which deenergizes solenoid 58, withdrawing roller 53, and thereby releasing the drive effect of roll 52 on strap 51.

Figure 3:
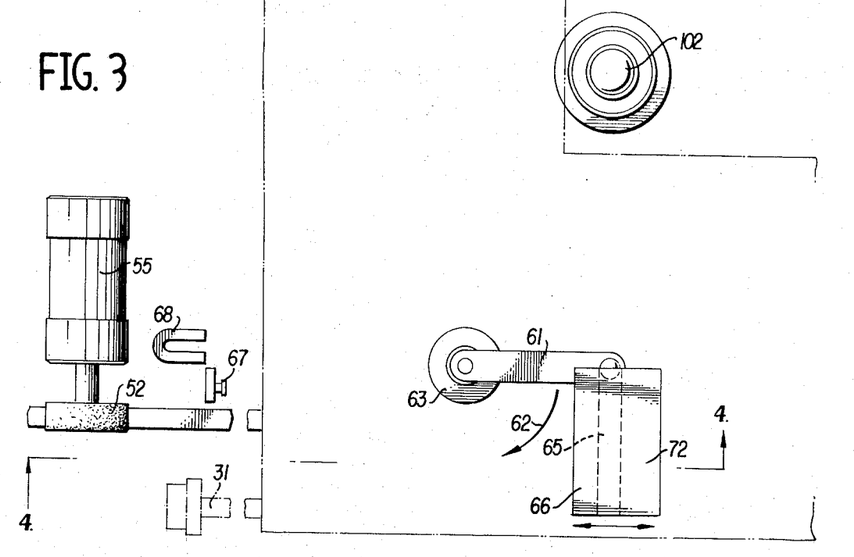
FIG. 3 is a sectional and enlarged fragmentary view taken along line 3—3 of FIG. 2.
Figure 4:
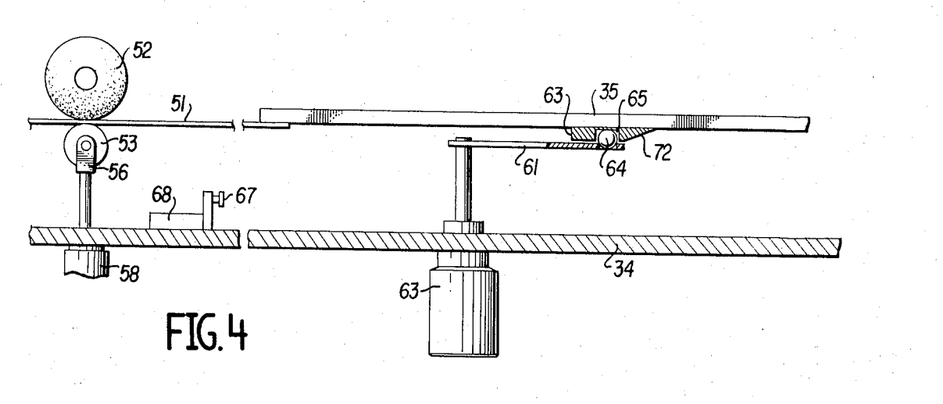
FIG. 4 is an elevation view of the fragmentary portion shown in FIG. 3.

The carriage 35 is now free to return to the left as viewed in FIGS. 1 and 2, in what is a non-scan or flyback mode of operation. Flyback of carriage 35 is accomplished by lever 61 being driven by motor 63 in a rotary path indicated by arrow 62. A ball 64 on the end of lever 61 enters slot 65 in plate 66 mounted on the bottom of carriage 35, translating the circular path of ball 64 into rectiliner motion of the carriage. The plate 66 and and lever 61 are relatively positioned so that when the carriage has reached the end of its traverse in the scan mode under the drive of roller 52, ball 64 is adjacent one end of slot 65, as shown in FIGS. 3 and 4. When the finger 59 on carriage 35 actuates switch 60 to stop the drive effect of roller 52, motor 63 is energized to drive lever 61, causing ball 64 to enter slot 65 and cam carriage 35 to the left, as viewed in FIGS. 1, 2, 3 and 4. The length of lever 61 is selected so that when it has traversed a 180° arc, carriage 35 is returned almost to its full flyback position. Because the ball 64 will leave the slot 65 at this point with the slot occupying a tangent relation to the arcuate or circular path of the ball 64, as the ball leaves the slot the return force applied by the ball 64 and lever 61 on carriage 35 is essentially zero. The limit of full flyback return of carriage 35 is selected by the abutment of carriage 35 against stop 67. The flyback return of the carriage by lever 61 being just short of this position, the last increment of this return traverse is effected by a magnetic pull on the carriage by magnet 68. When carriage 35 strikes the stop 67, finger 70 carried by bracket 71 depending from mount 20 actuates one of the switches 69. This switch actuation stops motor 63 and its lever 61, and energizes solenoid 58 to place roller 53 into pressure engagement with strap 51 and thereby cause drive roller 52 to once again drive carriage 35 in scan mode of traverse along the rails 31.

In the foregoing description the flyback drive of carriage 35 was initiated at the end of a complete scan traverse of carriage 35 along rails 31, so that ball 64 of lever 61 entered the end of slot 65. As will be described subsequently, controls may be provided whereby flyback may be initiated at an intermediate point in the scan traverse of carriage 35, before the end of a complete traverse. For this purpose portion 72 of plate 66 is beveled or sloped to enable the ball 64 of lever 61 to enter the slot 65 from locations other than endwise of the slot.

Figures 5, 6:
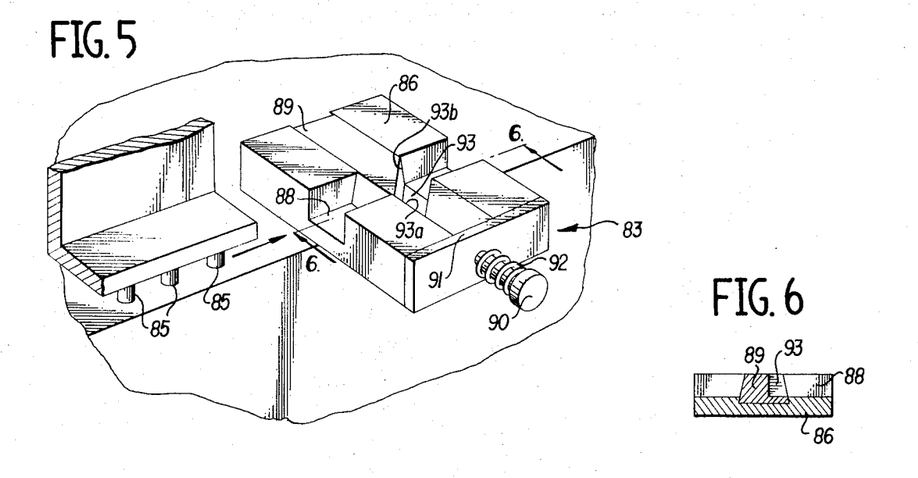
FIG. 5 is an enlarged perspective view of a stepping gate used in the present embodiment.
FIG. 6 is a sectional view taken along line 6—6 of FIG. 5.
Figure 7A:
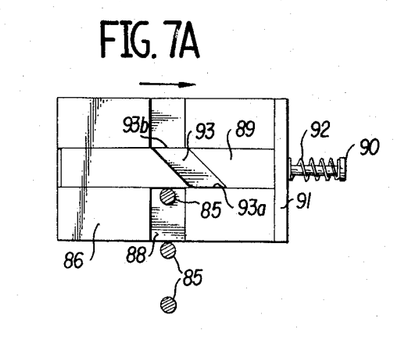
FIG. 7A–D are stepwise operational views of the gate shown in FIG. 5.
Figure 7B:
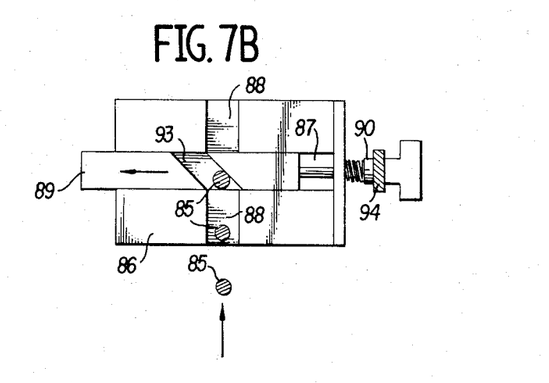
Figure 7C:
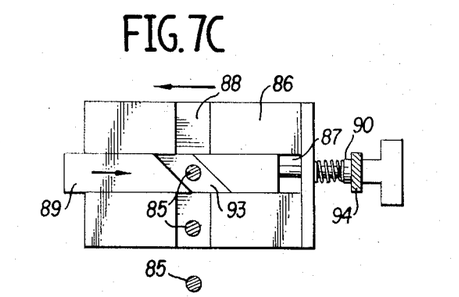
Figure 7D:
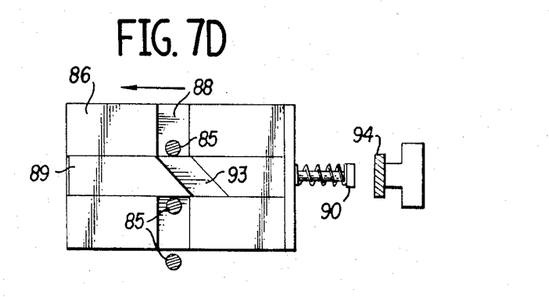

Referring next to the y axis transport of microfiche mount 20, it is accomplished in a stepwise manner by the combination of a constant force spring 80 acting between anchor 81 on carriage 35 and anchor 82 on mount 20, and a mechanical gate 83 mounted on carriage 35 cooperating with a series of depending pins 85 carried by mount 20. Gate 83 (see FIGS. 5, 6 and 7) comprises a plate 86 having a longitudinal channel 87 and transverse channel 88 formed in its upper surface. Channel 87 is closed by wall 91 at one end. Bar 89 is slidably mounted in channel 88 and is provided at one end with a projecting stem 90 which projects through a hole in the end wall 91 in channel 87. A coil spring 92 bears between the head of stem 90 and the exterior of end wall 91 to urge the bar 89 against said end wall in the position shown in FIG. 5. Bar 89 is provided with a diagonal channel 93 in its upper surface. An abutment 94 for stem 90 is provided on base 34. The line of pins 85 on mount 20 is positioned to cause the pins to enter channel 88. The operation of this gate 83 is illustrated in FIGS. 7A–D. Spring 80 forces mount 20 rearwardly on rails 32, or in the direction that would be upwardly in the drawing FIG. 1, until the first pin 85 enters the channel 88 and abuts the bar 89, as shown in FIG. 7A. This action locates the mount 20 in a first reference position along the y axis. When the mount 20 and carriage 35 are now caused to traverse to the right as shown in FIGS. 1 and 2 in a scan mode, at the end of the traverse and just before finger 59 engages switch 60, stem 90 of bar 89 is driven against the abutment 94, causing relative movement between the bar 89 and plate 86 against the compression of spring 92 until the end 93a of channel 93 aligns with channel 88 to receive the first pin 85. As a result, the first pin 85 enters the diagonal slot 93 and is held, as shown in FIG. 7B. As carriage 35 begins its flyback, spring 92 returns the bar 89 to its original position relative to plate 86 placing the end 93b of channel 93 in alignment with channel 88, permitting the first pin 85 to complete its passage through the diagonal channel 93 as the second pin 85 abuts the bar 89, as shown in FIGS. 7 c and 7d. In this manner, with the completion of each scan transverse of mount 20 and carriage 35 along the x axis on rails 31, the mount 20 is caused to advance one step along the y axis on rails 32. Movement of mount 20 in the reverse direction, however, as by pulling on handle 40, is freely accomplished, because in this direction of movement the bar 89 is freely cammed by the entrance of each pin 85 into channel 93 permitting the pins to pass through the gate freely.

The sequence of operation of the microfiche transport is therefore as follows. Mount 20 is pulled completely forward by handle 40 until cam follower roll 44 rides up cam surface 42 and sets in notch 43. The mount 20 is thus opened for positioning of a microfiche card therein. The mount is then pushed back manually to override the restraint of notch 43, and under the influence of spring 80 the mount is moved along rails 32 until the first pin 85 engages the gate 83. This positions the mount for a scanning transport of the first row of microfiche frames. The electrical control circuit of the machine (not shown) is then energized. The first action in the controlled sequence of operations is actuation of the flyback motor 63, causing carriage 35 to be moved to the left as viewed in FIGS. 1 and 2 until finger 70 engages the first in the line of switches 69. Actuation of switch 69 stops the flyback motor and engages the solenoid 58 to drive strap 51 against roll 52 operated by scanning drive motor 55. At this point, the mount is in position to begin the scan of the first microfiche frame in the first row of frames. Transport of carriage 35 and mount 20 is continued under the control of drive motor 55 until switch 60 is actuated by finger 59. Just before this occurrence, scan of the last microfiche frame in the first row has been completed and gate 83 has been actuated by abutment 94. On actuation of switch 60 solenoid 58 is deenergized, thereby releasing strap 51 and carriage 35 from the effect of drive roll 52, and at the same time flyback motor 63 is energized, causing flyback traverse of carriage 35. This time, when carriage 35 reaches the limit of flyback travel, gate 83 has passed the first pin 85, and when the flyback transport of carriage 35 is completed under the influence of magnet 68, finger 70 engages the second of switches 69. This switch actuation stops the flyback motor 63 and energizes solenoid 58 to bring strap 51 into driving engagement with roller 52. At this point traverse of the mount 20 causes a scan of the second row of microfiche frames on card 29 in mount 10. The scanning of successive rows of microfiche frames is continued in this manner until the last frame on the last row is scanned. At that point closure of switch 60 following closure of the last switch 69 causes a shut down of the entire transport mechanism instead of actuation of the flyback motor. Electrical circuitry for effecting the foregoing control functions in response to the sequence of switch operations is quite well known and understood in the art, and therefore is not disclosed in the accompanying drawings, as the same would only serve to confuse the disclosure, particularly since the circuitry per se forms no part of the present invention.

The purpose of the foregoing transport mechanism is, as stated above, to obtain a continuous row by row optical scan of the microfiche card for photocopying thereof and the production of macro copy in quasi book form. To this end, a stationary light 101 is positioned over the mount 20, and an enlarging lens 102 is positioned under the carriage 35 in the top of the housing 34. The light source and lens are located in optical alignment and in a position to effect the scan operation of the microfiche card 29 outlined above as a result of the described scanning transport operation of mount 20. The enlarged optical image from microfiche 29 formed by lens 102 passes through scanning slit 103 and is focused on the surface of a rotating xerographic photoreceptor drum 104. As is conventional and well understood in the art; the light image thus applied to drum 104 produces an electrostatic latent image that is developed with electroscopic toner powder at development station 105; this developed image is transferred to paper web 106 at transfer station 107, thereby providing a succession of images of the frames of the microfiche card 29 on web 106; the transferred images on web 106 are fused to the web at 108; after transfer, residual toner on drum 104 is removed by brush 109, residual electrostatic image charges are dissipated at 110, and the surface of drum 104 is uniformly electrostatically charged at 111 in readiness to continue to receive and record optical images through scanning slit 103.

The paper web 106 on which the copies of microfiche data are reproduced is shown as a fanfolded web, which when folded provides a stack of rectangular sections or panels. Each such panel is formed by successively reversed folds along crease lines 112. In addition, on either side of alternate crease lines each panel is punched with a series of holes 113. When fanfolded, the punched holes 113 for all the panels are aligned along one side of the stack. These aligned holes provide for ready edge binding of a selected stack of the panels, providing a quasi duplex book form for the bound stack which may be paged through from the edge of the stack opposite the binding. Opposite sides of a page are thus in actuality composed of two successive panels of the fanfolded web.

In order to provide effective book form reproductions, the scan of each frame of the microfiche card 29 must be synchronized with the feed of web 106, so that each complete microfiche frame is centrally duplicated on a separate panel of the web 106. This result is accomplished by the photocell and light source couple 114 sensing the passage of the successive lines of punched holes 113 in web 106, and a similar photocell and light source couple 115 sensing the passage of successive notches 116 in bar 117 mounted on carriage 35. Notches 116 bear an established positional relationship to the beginning of each frame along a row of frames on a microfiche card 29 registered in the mount 20. The position of the photocell-light couple 114 occupies an established relationship along the web feed path to the travel path of an image on drum 104 from scanning slit 103 to the transfer station 107. Said relationship of these two photocell-light couples are established so that when the two photocell-light couples sense their respective apertures in synchronism or in time coincidence, the printout of the following microfiche frame will occur centered on the following panel of web 106. In order to maintain this synchronism, appropriate coincidence measuring circuitry, as is well known in the art, is employed, and a variable speed motor is used for drive motor 55 with well known control circuitry to spend up or slow down the motor in accordance with any out of coincidence relationship between the outputs of the two photcell-light couples 114 and 115.

When a microfiche card 29 has been placed in mount 20 and the mount has been moved to starting position, as previously explained, and the operational and control circuits are energized, flyback motor 63 is energized and the carriage is moved to its starting position with finger 70 actuating the first in the line of switches 69. This would be all that would be necessary to start the scanning movement of carriage 35 if it were not necessary to synchronize the scan with the movement and position of the panels of web 106. Therefore, after the first switch 69 is actuated, scanning transport of carriage 35 is not begun until a set of punched apertures 113 passes the photocell-light couple 114, to be certain that the line of scan starts with the necessary synchronism between web feed position and microfiche scan position. The same is also true for the scan of each successive row of the microfiche 29. The web 106 is continuously fed at all times that the system is engerized, therefore during each flyback operation synchronism between microfiche scan and web feed is lost. Accordingly, scanning transport of carriage 35 after actuation of each switch 69 is not commenced until the passage of a set of punched apertures 113 is sensed by photocell-light couple 114.

It is aparent the foregoing system can be utilized to scan a complete microfiche card. It is also apparent that since the system has information through the switches 69 as to which row is being scanned, and through the notches in bar 16 as to which frame in the row is in scan position, one can readily provide control circuitry to shut the machine off when a particular frame is reached; or indeed, one could provide more elaborate controls for automatically selecting any particular frame or frames, or sequence of frames for reproduction.

Having thus described one specific embodiment of the invention for purposes of illustration and to facilitate a complete understanding thereof, it is apparent that numerous modifications and variations will be apparent to those skilled in the art. Therefore, it is not intended that the scope of the invention be limited to the particular form or details of this embodiment, and any modifications or variations that are embraced by the spirit and scope of the appended claims are contemplated on being within the purview of the invention.

What is claimed is:

1. A microfiche copier, comprising a holder for mounting a microfiche having a sereis of rows of image frames, means mounting said holder for traverse along a first axis, means mounting said holder for traverse along a second axis, first drive means for traversing said holder continuously and uninterruptedly in one direction along said second axis in a scanning mode over the extent of a row of microfiche image frames, additional drive means traversing said holder in the other direction along said second axis in a flyback mode, means defining the limit of traverse in said scanning mode and for actuating said additional drive means, means defining the limit of traverse in said flyback mode and for actuating said first drive means, stepping means actuated at one of said limits of traverse for traversing said holder a fixed incremental distance corresponding to the spacing between rows of microfiche image frames in one direction along said first axis, copying means, and optical means for projecting to said copying means images of successive frames of a microfiche positioned in said holder during a said scanning mode traverse of said holder.

2. A microfiche copier as set forth in claim 1, wherein said copying means includes a web upon which said images are reproduced, feed means for driving said web to expose successive predetermined portions thereof to said successive images, and means for sensing the passage of predetermined increments of said web, means associated with said holder for sensing predetermined increments of traverse of said holder in said scanning mode of traverse, said web increments and said scanning mode traverse increments being related to enable synchronizing of said scanning mode traverse with said web feed to locate successive frame images on said successive web portions.

3. A microfiche copier as set forth in claim 2, wherein said web is a fanfold of panels, each panel having punches positioned along an edge adjacent alternate folds, said web increment sensing means sensing the passage of said punches.

4. A microfiche copier as set forth in claim 3, wherein said web increment sensing means is a photoelectric-light couple.

5. A microfiche copier as set forth in claim 3, wherein said means for sensing increments of traverse of said holder comprises a series of incrementally spaced indicia carried by said holder, and means for sensing the passage of said indicia past a reference point in said scanning mode traverse.

6. A microfiche copier as set forth in claim 5, wherein said indicia are a series of apertures in a plate positioned along said second axis, and said indica sensing means is a photoelectric-light couple.

7. A transport apparatus for facilitating the row by row scanning of a microfiche having rows of image frames, comprising a base, first ways on said base defining a line of traverse on a first axis, a carriage, means mounting said carriage on said first ways for traverse along said first axis, second ways on said carriage defining a line of traverse on a second axis perpendicular to said first axis, a holder, means mounting said holder on said second ways for traverse along said second axis, said holder comprising a pair of overlying frame plates both open in their central areas, means for locating a microfiche in a reference orientation between said plates with the images of said microfiche positioned in said open central areas, actuatable means on said holder and carriage for effecting controlled incremental stepping movement of said holder along said second ways, means defining the limits of traverse of said carriage corresponding to a row of microfiche image frames along said first ways in both directions of said first axis, means for repetitively and cyclically driving said carriage for continuous uninterrupted traverse in each of said both directions between said limits, and means on said base for actuating said stepping means at a selected point in the cyclical traverse of the carriage to effect one incremental stepping movement of said holder corresponding to the spacing between rows of microfiche image frames with each cyclical traverse of said carriage.

8. A transport apparatus as set forth in claim 7, wherein said means defining said limits of traverse comprises switch means controlling said carriage drive means for reversing the direction of drive at each limit of traverse.

9. A transport apparatus as set forth in claim 7, wherein said incremental stepping means comprises a set of pins on said holder equally spaced in a line parallel with said second axis, gate means on said carriage positioned to obstruct the passage of said pins thereby, means for constantly forcing said holder in a direction along said second axis to force a first of said pins against said gate means, said actuating means opening said gate means for the passage of one pin therepast on each cycle of traverse of said carriage.

10. A transport apparatus as set forth in claim 7, and further including means for continually sensing the position of said holder in its traverse along said first axis.

11. A transport apparatus as set forth in claim 10, and further including means for continually identifying the position of said holder in its incremental traverse along said second axis.

12. A transport apparatus as set forth in claim 7, and further including means for continually identifying the position of said holder in the incremental traverse along said second axis.

13. A transport apparatus as set forth in claim 7, and further including means for separating said frame plates to enable removal and insertion of a microfiche therebetween.

* * * * *